United States Patent
Kessler et al.

(10) Patent No.: US 6,922,846 B2
(45) Date of Patent: Jul. 26, 2005

(54) MEMORY UTILIZATION FOR SET TOP BOX

(75) Inventors: Damien Kessler, San Jose, CA (US); Gregor Said Jackson, Los Gatos, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 1016 days.

(21) Appl. No.: 09/827,951

(22) Filed: Apr. 9, 2001

(65) Prior Publication Data

US 2002/0147994 A1 Oct. 10, 2002

(51) Int. Cl.⁷ .............................................. H04N 7/713
(52) U.S. Cl. ...................... 725/151; 725/131; 725/134; 725/139; 713/1; 713/176; 713/187
(58) Field of Search ................................. 725/131, 134, 725/139, 151; 711/103, 170; 713/1, 2, 176, 187

(56) References Cited

U.S. PATENT DOCUMENTS

| | | | |
|---|---|---|---|
| 6,463,535 B1 * | 10/2002 | Drews | 713/176 |
| 6,587,947 B1 * | 7/2003 | O'Donnell et al. | 713/187 |
| 6,820,196 B2 * | 11/2004 | Kessler | 713/1 |

* cited by examiner

*Primary Examiner*—Krista Bui
(74) *Attorney, Agent, or Firm*—Rader, Fishman & Grauer PLLC (57) ABSTRACT

An improved architecture for a set-top box that effects a reduction in memory requirements includes a front-panel board and a DTV board subject to a reset sequence and having a non-volatile memory associated therewith for storing values including a power-state value. The improved architecture eliminates the need for a non-volatile memory associated with the front-panel board by querying the power-state variable in the non-volatile memory associated with the DTV board and effecting a boot-up sequence when the power-state variable is set to ON and by effecting a reset in response to certain detected conditions.

1 Claim, 7 Drawing Sheets

SEE FIG. 7

PRIOR ART

MEMORY UTILIZATION FOR SET TOP BOX

BACKGROUND OF THE INVENTION

The present invention relates to set-top boxes of the type used in consumer/home applications for processing audio/video signals, including signals provided by cable and, more particularly, to a hardware/firmware organization that allows for a reduction in memory requirements and a consequent savings in cost.

Set-top boxes (STB) are a common electronic device in many homes and are used to process televisions signals provided, for example, from a cable, into various consumer devices, particularly television sets. In general, set-top boxes include signal processing devices to process the particular digital (and/or analog) audio and/or video signals, one or more microprocessors that handle supervisory and control functions, and one or more volatile and non-volatile memories designed to store short-term and long-term information. The microprocessors are controlled by firmware that includes control sequences and sub-sequences for all the functions provided by the set-top box.

Figure 1:
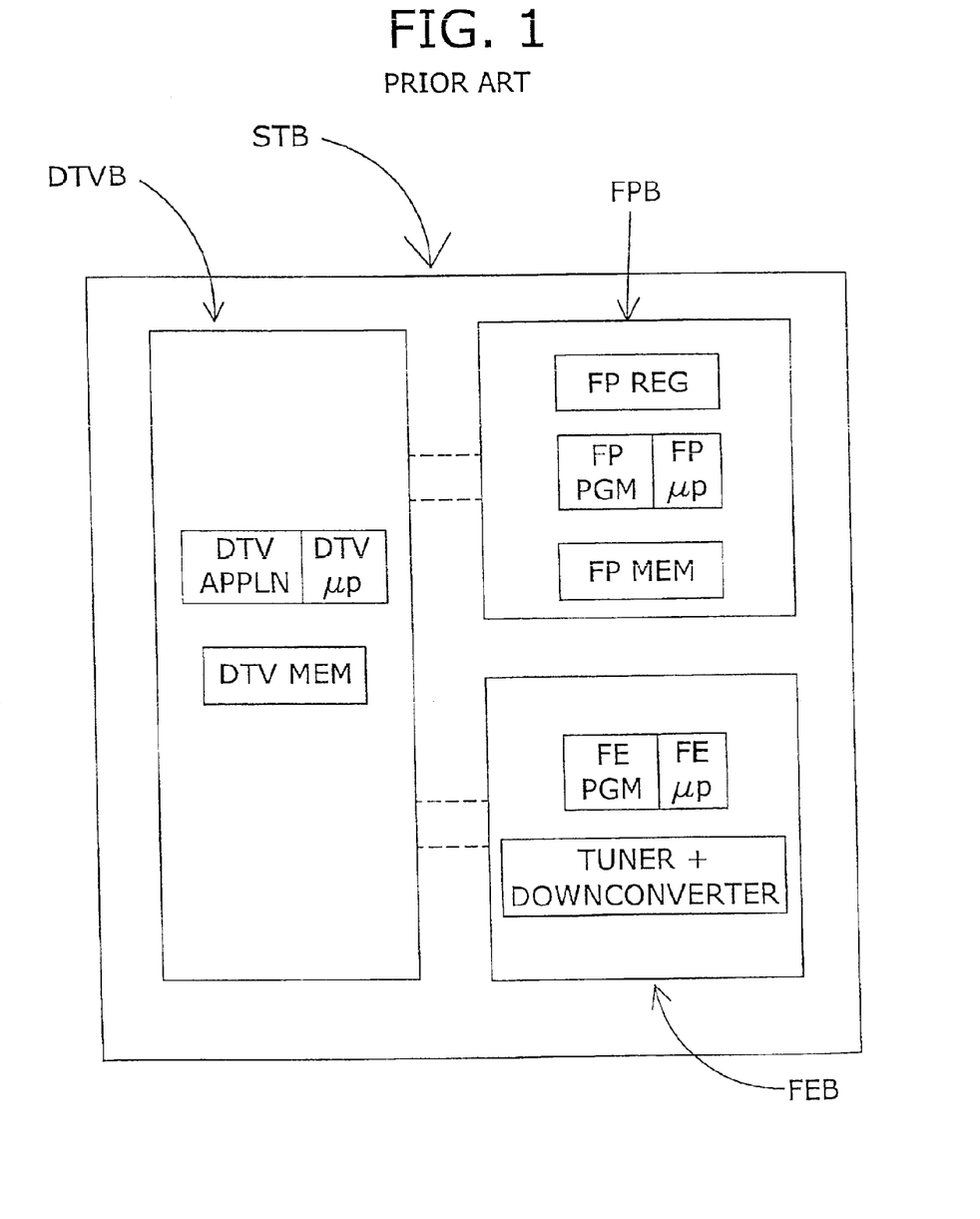
FIG. 1 is a simplified schematic block diagram of the architecture of a known set-top box.

FIG. 1 illustrates, in schematic form, the general architecture of a known set-top box STB manufactured by the Sony Corporation of Tokyo, Japan for the processing of digital television (DTV) signals. The set-top box STB includes a DTV board DTVB that includes, among other devices, a microprocessor DTV $\mu$p and an associated non-volatile memory DTV MEM that stores various user settings and other operating parameters. Additionally, the set-top box STB includes a front-panel board FPB that includes a register FP REG for recording or otherwise storing user command key presses, and, like the DTV board, includes a microprocessor FP $\mu$p and associated non-volatile memory FP MEM. Lastly, the set-top box STB includes a front-end board FEB that includes a board-specific microprocessor FE $\mu$p and a tuner and a down-converter. As shown in generic dotted-line illustration, data and control busses/lines interconnect the various boards. In the particular implementation shown, each microprocessor is run or operated by its own firmware and effects control of its own board-specific functions. Thus, the microprocessor DTV $\mu$p on the DTV board DTVB is under the control of a DTV application DTV APPLN, the microprocessor FP $\mu$p on the front-panel board FPB is under the control of a front-panel program FP PGM, and, lastly, the microprocessor FE $\mu$p on the front-end board FEB is under the control of a front-end program FE PGM. In addition to their specific application program, each microprocessor includes a boot-up or initialization routine that runs or executes when electrical power is initially supplied to the microprocessor. The boot-up sequence can automatically invoke the desired application or invoke the application in response user initiated command or key press.

Figure 2:
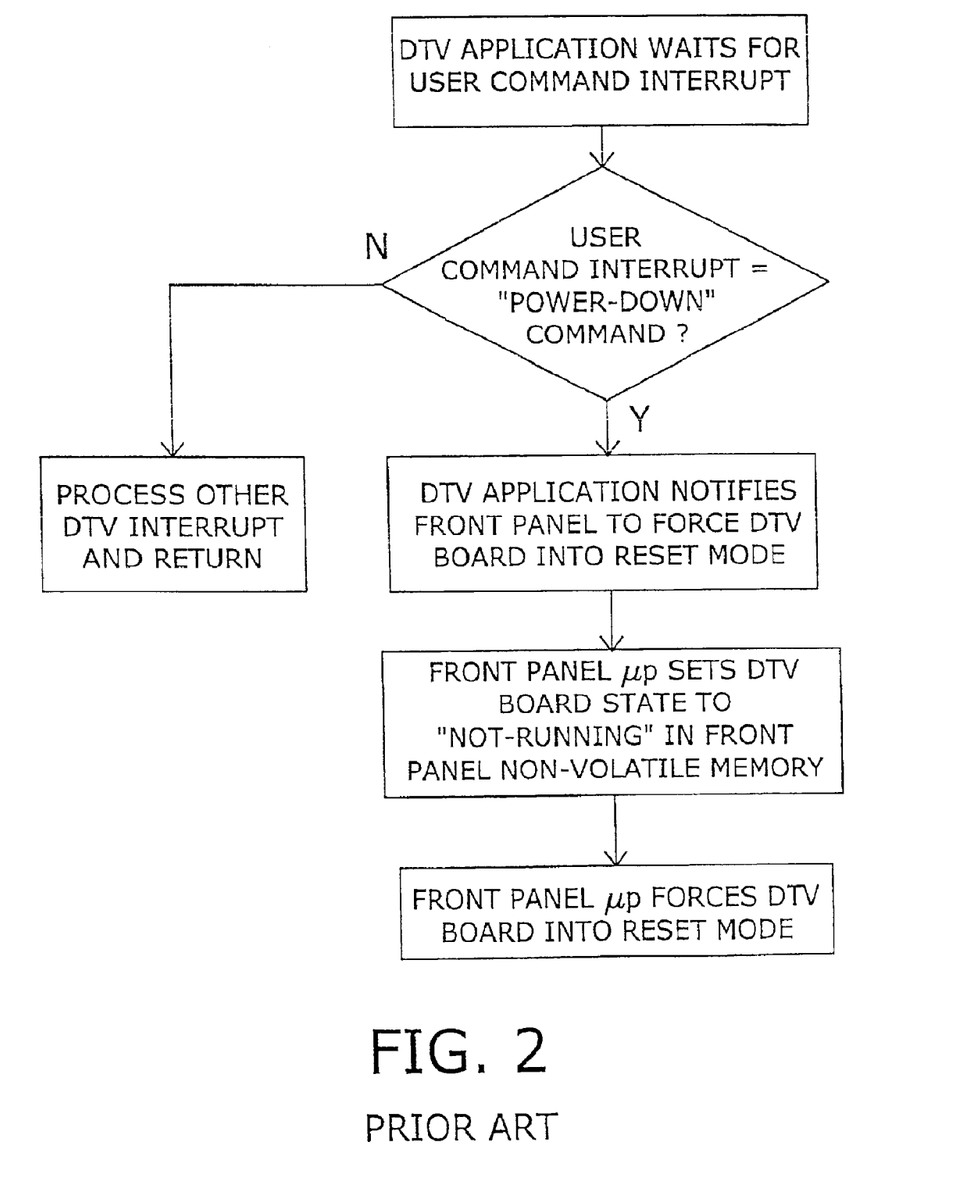
FIG. 2 is a flow diagram of a known power-down sequence for the set-top box architecture of FIG. 1.
Figure 3:
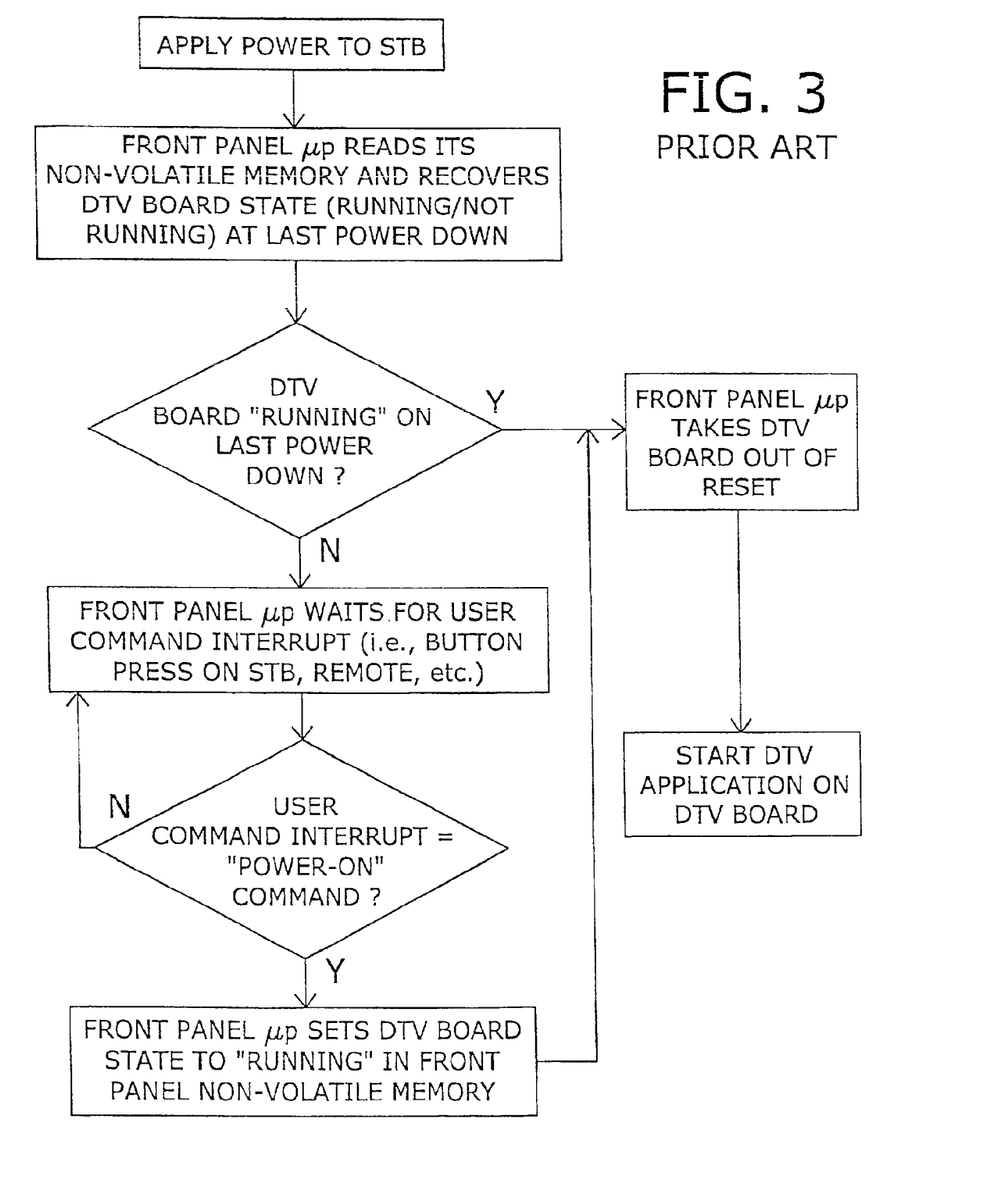
FIG. 3 is a flow diagram of a known re-powering or power-up sequence for the set-top box of FIG. 1.

The set-top box STB described above in relationship to FIG. 1 has a "power-down" sequence, as shown in FIG. 2, and a "power-up" sequence, as shown in FIG. 3.

As shown in FIG. 2, the "power-down" sequence is invoked in response to a user-command. The firmware includes a sequence that waits for a user-command interrupt. The user-command interrupt can occur in response to a button press on the set-top box STB or a button press on a 'remote' unit (not shown) associated with the set-top box STB. Once a user-command interrupt is detected, a query determines whether or not the command is a 'power-down' command. If the interrupt is not a 'power-down' command, the application processes that command or request and returns to its wait state to again wait for another command interrupt. Conversely, if the interrupt is a 'power-down' command, the DTV application notifies the front-panel board FPB to force the DTV board DTV into its reset mode and, either concurrently therewith or shortly thereafter, sets a variable in the non-volatile memory FP MEM on the front-panel board FPB indicative of the running/not-running state to the "not-running" state. The DTV board DTVB is then concurrently or shortly thereafter forced into its reset mode by the front-panel board FPB. Thus, the power-down sequence shown in FIG. 2 is effective to both store a "not-running" value or flag in the non-volatile memory FP MEM on the front-panel board FPB and also force the DTV board DTVB into its reset mode in response to a 'power-down' user-command.

As can appreciated, the power-down sequence does not occur in the event of an unintentional power interruption, i.e., a power failure or inadvertent removal of the power plug from the wall outlet. As a consequence of an unintentional power-down, the running/not-running variable remains set in its running state.

The power-up sequence for the physical architecture of FIG. 1 is shown in FIG. 3. As shown, power is supplied to the set-top box STB with the front-panel board program FP PGM thereafter reading its non-volatile memory FP MEM in order to recover the running/not-running variable. The subsequent query determines whether or not the DTV board DTVB was running or not-running on the last power-down or power interruption. In the event the DTV board DTVB was 'running', the front-panel board FPB takes the DTV board DTVB out of reset; the microprocessor DTV $\mu$p on the DTV board DTVB runs its boot-up sequence and then starts the DTV application DTV APPLN on the DTV board DTVB. Conversely, if the DTV board DTVB was 'not-running', the front-panel board FPB waits for a user-command interrupt in the form of a button press on the set-top box STB or its remote. If a command interrupt is detected and that command interrupt is a "power-on" command, the front-panel board FPB sets the "running/not-running" variable to its "running" state in its non-volatile memory FP MEM. Concurrently therewith or shortly thereafter, the DTV board DTVB is taken out of reset which then starts the DTV application DTV APPLN on the DTV board DTVB.

The architecture of FIG. 1 thus utilizes the non-volatile memory FP MEM on the front-panel board FPB as part of the power-down/power-up sequence; a cost benefit can be realized if the architecture thereof can be reorganized to eliminate the need for the non-volatile memory FP MEM on the front-panel board FPB.

SUMMARY OF THE INVENTION

In view of the above, it is an object of the present invention, among others, to provide an improved architecture for a set-top box of the type described that reduces memory requirements to effect a decrease in manufacturing costs.

It is another object of the present invention to provide an improved memory utilization for a set-top box of the type described in which the non-volatile memory associated with the front-panel board is eliminated.

The present invention advantageously provides an improved memory utilization for set-top boxes of the type used to process audio/video signals in a DTV context. The set-top box architecture includes a front-panel board and a DTV board that has its own non-volatile memory for storing various user default settings, the auto programming tables, and related information. The non-volatile memory is also used to also store the running/reset state of the DTV board by providing a "power state" variable to the parameters saved into the memory. When power is initially applied to the set-top box, the front-panel board takes the DTV board out of reset to cause the boot-up firmware on the DTV board to execute. The boot-up firmware reads the non-volatile memory on the DTV board and determines the value of the "power state" variable. If the "power state" value is "on" (i.e., the DTV application was actually running at the time the set-top box was last powered down), the boot-up firmware continues initialization and starts the DTV application. Conversely, if the power state variable is "off", the boot-up firmware determines the cause of the DTV board being taken out of reset, i.e., whether or not the DTV board was taken out of reset upon a normal power-up or if the user pressed the "power-up" button. The sequence discriminates between the two possible events by reading the state of a front-panel register that is set with each user-initiated key press on the remote unit with the value of the depressed key being stored in the front-panel 5 register. When the value of the "power state" variable is "off", the boot application reads the front-panel register: if the value in the front-panel register corresponds to a valid DTV "power-up" key, the boot application starts the DTV application in response to the user-requested "power-up" command. Otherwise, the boot application stops its initialization phase and sends a request to the front-panel board to put the DTV board back into its reset mode. Every time the DTV application is started, the "power state" variable is set to "on" and its new value is saved into the non-volatile memory on the DTV board. The "power state" value will be reset to an "off" value only in response to a user commanded "power-down" key press. In the event of a "power-down" key press, the DTV application saves the new value in the non-volatile memory on the DTV board and sends a request to the front-panel board to put the DTV board into reset.

The improved set-top box architecture dispenses with the need for the hithertofore used separate non-volatile memory on the front-panel board with the improved instruction firmware sequence providing reliable operation with reduced memory utilization and resulting cost benefits.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 4:
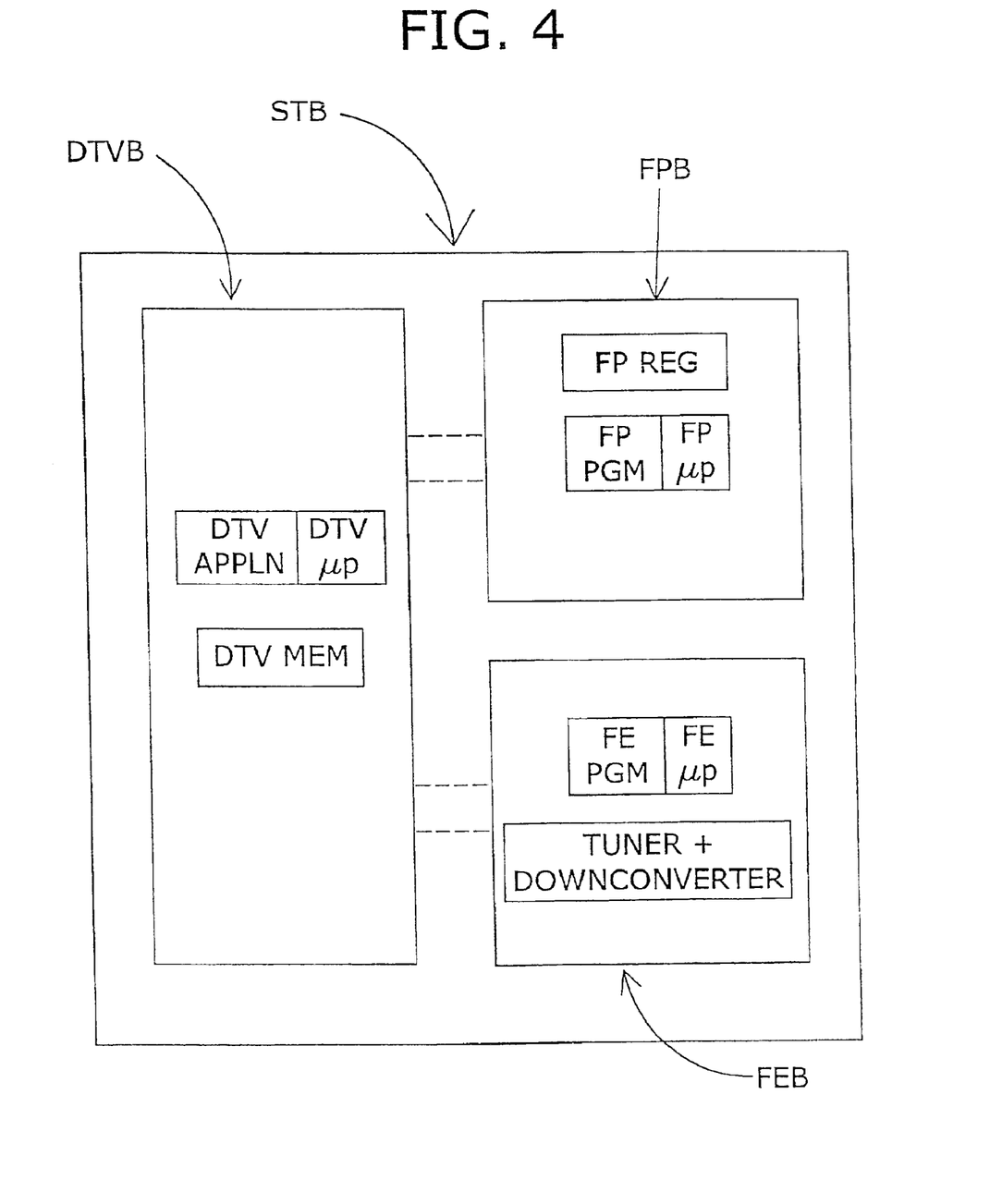
FIG. 4 is a schematic block diagram, similar to that of FIG. 1, of the architecture of a set-top box in accordance with the present invention.
Figure 5:
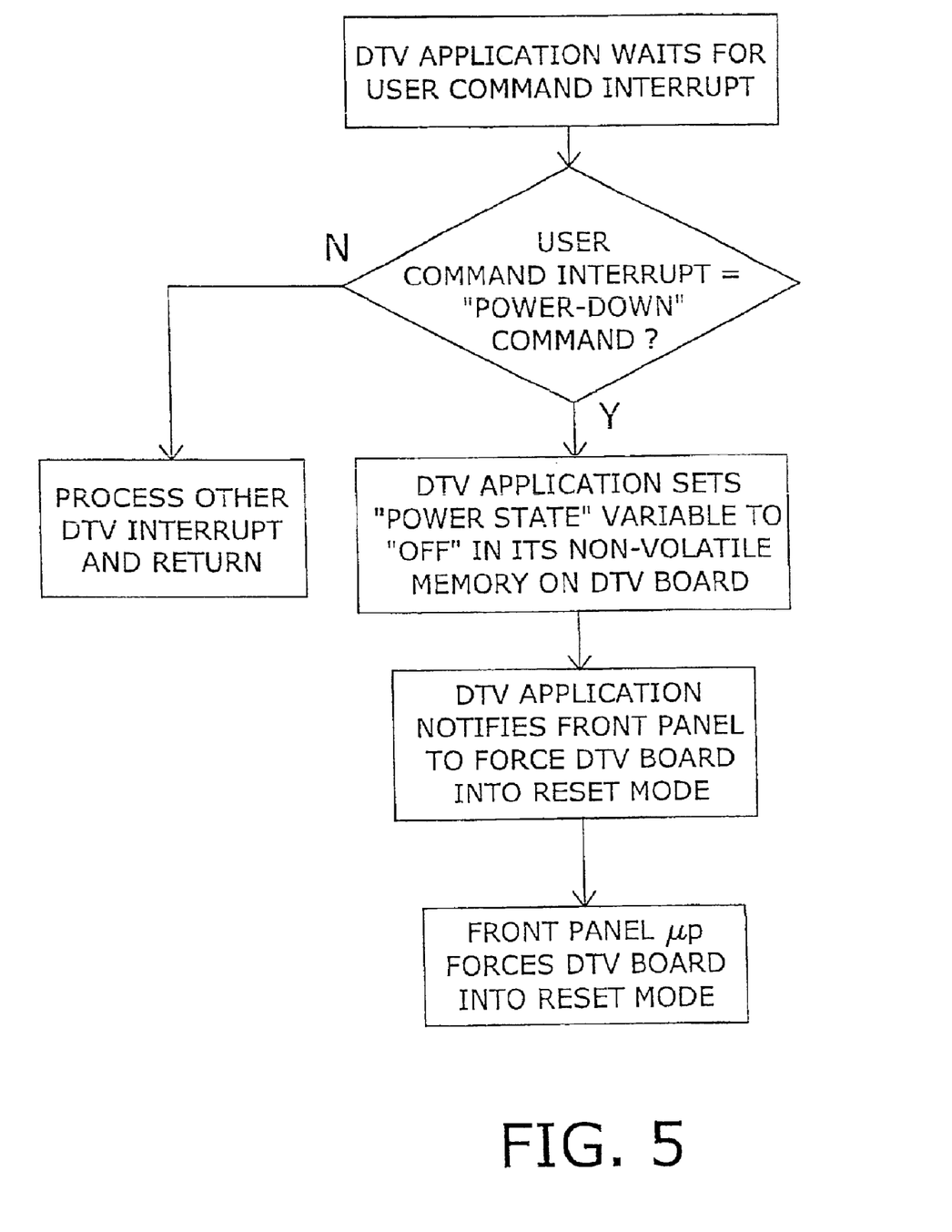
FIG. 5 is a flow diagram of a power-down sequence for a set-top box in accordance with the present invention.
Figure 6:
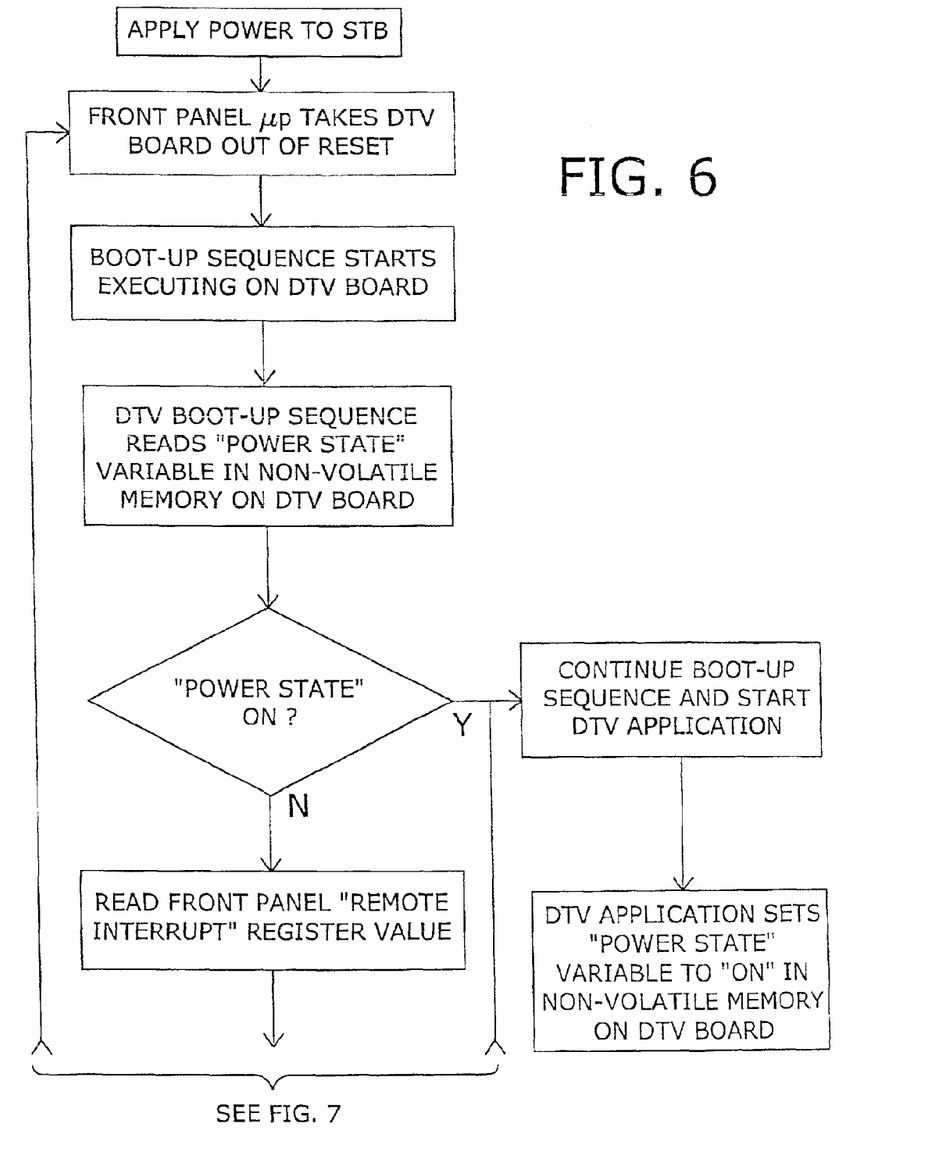
FIGS. 6 and 7 represent a single flow diagram of an improved re-powering or power-up sequence for a set-top box in accordance with the present invention.
Figure 7:
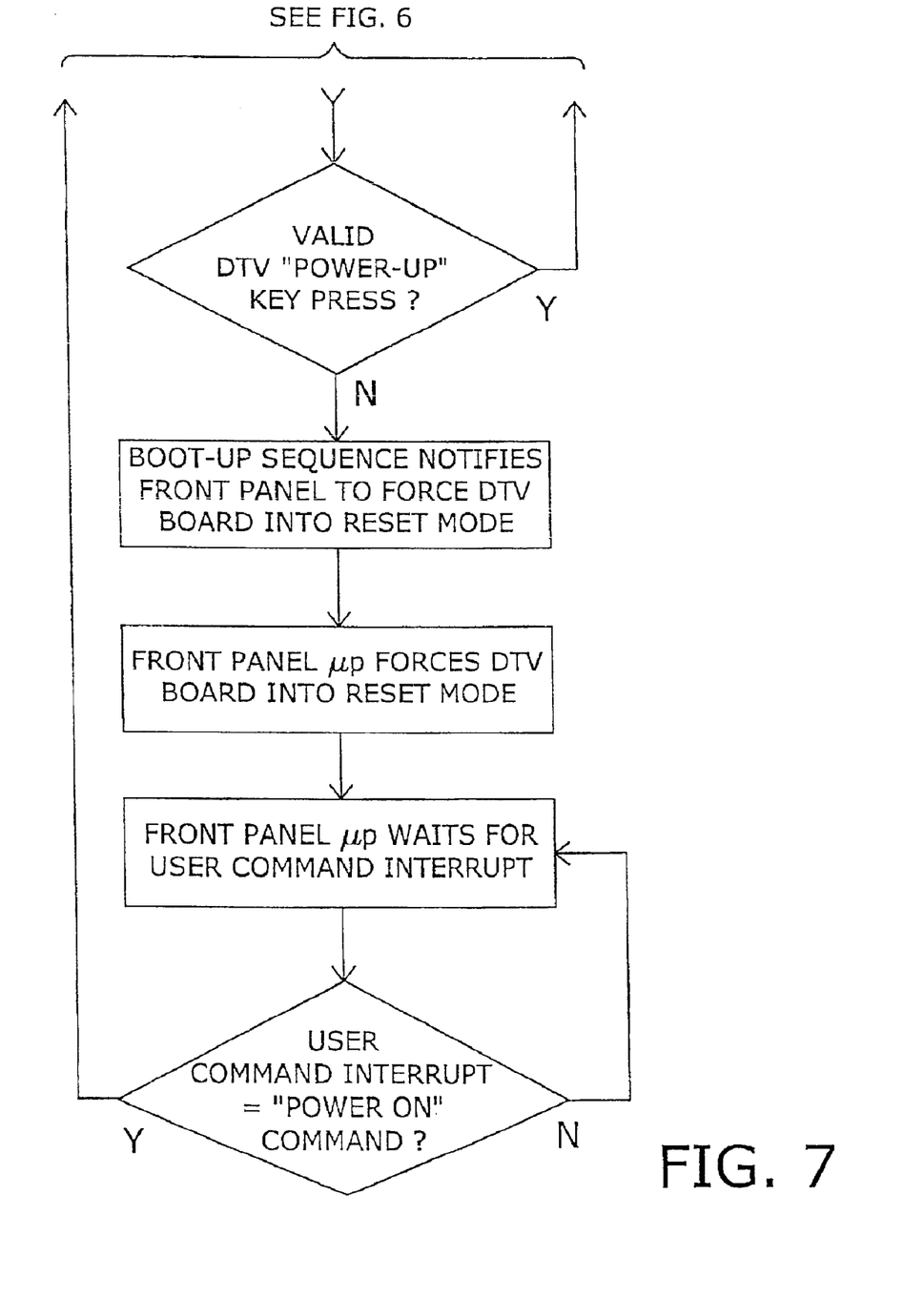

An improved architecture for a set-top box of the type described above in relationship to FIG. 1 is shown in FIG. 4 in which the same components as shown in FIG. 1 are represented by the same reference characters and in which the non-volatile memory FP MEM formally associated with the front-panel board FPB (as shown in FIG. 1) has been eliminated for cost-reduction purposes and in which an improved power-down/power-on instruction sequence (as shown in FIGS. 5–7) successfully accommodates the improved cost-reduced hardware architecture.

As shown in FIG. 5 (and in a manner consistent with the previously described power-down sequence of FIG. 1), the firmware includes a sequence that waits for a user-command interrupt. The user-command interrupt can occur in response to a button press on a 'remote' control unit associated with the set-top box STB or a button press on the set-top box STB itself Once a user-command interrupt is detected, a query determines whether or not the command is a 'power-down' command. If the interrupt is not a 'power-down' command, the application processes that command or request and returns to its wait state to again wait for another command interrupt. Conversely, if the interrupt is a 'power-down' command, the DTV application DTV APPLN running on the DTV board DTVB sets the "power state" variable in its non-volatile memory DTV MEM to the OFF state. Thereafter, the DTV application DTV APPLN notifies the front-panel board FPB to force the DTV board DTVB into its reset mode. Thus, the power-down sequence shown in FIG. 3 is effective to both store or set an OFF "power state" value or flag in the non-volatile memory DTV MEM on the DTV board DTVB and also force the DTV board DTVB into its reset mode in response to a "power-down" user-command from an appropriate key press on the 'remote' unit or on set-top box STB itself. In contrast to the power-down sequence of FIG. 2 (in which a "not running" variable is set in the front-panel memory FP MEM), the corresponding power-down sequence of FIG. 5 does not require the presence of any non-volatile memory on the front-panel board FPB.

As can appreciated, the power-down sequence of FIG. 5 (in which the "power state" variable in the memory DTV MEM on the DTV board DTVB is set to OFF) does not occur in the event of an unintentional power interruption, i.e., a power failure or inadvertent removal of the power plug from the wall outlet. As a consequence of an unintentional power-down, the ON/OFF power state variable in the non-volatile memory DTV MEM remains its ON state.

The re-powering or re-start sequence is shown in FIGS. 6 and 7. As shown in FIG. 6, when power is initially restored or re-applied to the set-top box STB, the front-panel board FPB always takes the DTV board DTVB out of reset and, shortly thereafter or concurrently therewith, the boot-up instruction sequence on the DTV board DTVB starts executing. The boot-up sequence then reads the "power state" variable in the non-volatile memory on the DTV board DTVB. The "power state" variable is then queried: if the "power state" variable is set to ON, the boot-up sequence continues to start the DTV application DTV APPLN. An ON "power state" variable indicates that the DTV application DTV APPLN was running at the moment power was last interrupted. Concurrently therewith or shortly thereafter, the "power state" variable is set to ON. This set or reset to ON event occurs unconditionally.

If the "power state" query indicates that the "power state" is set to OFF, the register FP REG on the front-panel board FPB is read; the front-panel register FP REG records each interrupt including each remote unit key press. Where a "remote interrupt" is indicated (as shown in the lower part of FIG. 6), a query is presented to determine if that recorded interrupt was a valid "powerup" key press (which indicates that the user wishes to run the DTV application DTV APPLN). If a valid "power-up" key press is detected (i.e., either from the remote unit or from a control panel on the set-top box STE), the boot-up sequence proceeds (shown in FIG. 6) as discussed above to start execution of the DTV application DTV APPLN.

Conversely, if a "power-up" key press is not detected, the boot-up sequence notifies the front-panel board FPB to force the DTV board DTVB back into reset at which time all processing by the microprocessor DTV μp on the DTV board DTVB ceases. If no user-command interrupt is detected, the front-panel microprocessor FPB μp loops without interruption to maintain the wait state status until such a command interrupt is detected. If and when a "power-on" command is detected, the front-panel board FPB takes the DTV board DTVB out of reset (FIG. 7). Thereafter and as discussed above, the microprocessor DTV μp on the DTV board DTVB re-proceeds though its boot-up execution, the reading of the "power state" variable, and the branching through to the continuation of the boot-up sequence and the starting of the DTV application DTV APPLN.

In contrast to the prior art sequence of FIG. 3 for the hardware architecture of FIG. 1, the improved architecture of FIG. 4 eliminates the need for the non-volatile memory FP MEM on the front-panel board FPB (shown in FIG. 1) and the sequence of FIGS. 6 and 7 accommodates the improved architecture by assigning the power-state memory variable to the non-volatile memory DTV MEM on the DTV board DTVB and by unconditionally taking the DTV board DTVB out of reset so the boot-up application thereon can determine the state of the power-state memory variable. Thus, the present invention achieves a cost-reduction over the architecture of FIG. 1 by eliminating the need for the non-volatile memory FP MEM formally used on the front-panel board FPB.

The improved architecture provides a cost-reduced organization and a corresponding re-powering sequence that is memory efficient. The sequence of FIGS. 6 an 7 will force the DTV board DTVB into a reset unless (a) the DTV board DTVB was in a running state when it was last powered-down or (b) if the user issues a normal power-on command.

As will be apparent to those skilled in the art, various changes and modifications may be made to the illustrated improved memory utilization for a set-top box of the present invention without departing from the spirit and scope of the invention as determined in the appended claims and their legal equivalent.

What is claimed is:

1. An improved memory utilization sequence for a set-top box for processing audio/video signals of the type having a DTV board subject to reset and out-of-reset commands and having a non-volatile memory associated therewith for storing values including a power-state variable having at least an ON state and an OFF state and having a microprocessor controlled by an operating sequence, and at least one other board having a register for storing user inputted commands including a 'power-up' command and devices thereon for placing the DTV board into reset and for taking the DTV board out of reset, characterized by the steps of:

taking the DTV board out of reset upon application of power to the set-top box;

starting execution of a boot-up sequence including the querying the power-state variable in the non-volatile memory associated with the DTV board; and if the power-state variable is ON, continuing execution of the boot-up sequence including setting of the power-state variable to ON, or if the power-state variable is OFF, querying the register for a 'power-up' value; and if the power-up value is present, continuing execution of the boot-up sequence including setting of the power-state variable to ON; or if the power-up value is not present, commanding the DTV board to its reset state until a power-on command is detected upon which the DTV is taken out of its reset state.

* * * * *